US012438916B2

(12) United States Patent
Crabtree et al.

(10) Patent No.: US 12,438,916 B2
(45) Date of Patent: Oct. 7, 2025

(54) INTELLIGENT AUTOMATED PLANNING SYSTEM FOR LARGE-SCALE OPERATIONS

(71) Applicant: QOMPLX LLC, Reston, VA (US)

(72) Inventors: Jason Crabtree, Vienna, VA (US); Andrew Sellers, Monument, CO (US)

(73) Assignee: QOMPLX LLC, Reston, VA (US)

( * ) Notice: Subject to any disclaimer, the term of this patent is extended or adjusted under 35 U.S.C. 154(b) by 0 days.

(21) Appl. No.: 18/433,378

(22) Filed: Feb. 5, 2024

(65) Prior Publication Data

US 2024/0179185 A1 May 30, 2024

Related U.S. Application Data

(63) Continuation of application No. 17/106,997, filed on Nov. 30, 2020, now Pat. No. 11,979,433, which is a continuation-in-part of application No. 15/931,534, filed on May 13, 2020, now abandoned.

(51) Int. Cl.
| | |
|---|---|
| G06F 16/2458 | (2019.01) |
| G06F 16/951 | (2019.01) |
| H04L 9/40 | (2022.01) |

(52) U.S. Cl.
CPC .......... *H04L 63/20* (2013.01); *G06F 16/2477* (2019.01); *G06F 16/951* (2019.01); *H04L 63/1425* (2013.01); *H04L 63/1441* (2013.01)

(58) Field of Classification Search
CPC .................... G06F 16/2477; G06F 16/9024
See application file for complete search history.

(56) References Cited

U.S. PATENT DOCUMENTS

| | | |
|---|---|---|
| 5,669,000 A | 9/1997 | Jessen et al. |
| 6,256,544 B1 | 7/2001 | Weissinger |
| 6,477,572 B1 | 11/2002 | Elderton et al. |
| 7,072,863 B1 | 7/2006 | Phillips et al. |
| 7,171,515 B2 | 1/2007 | Ohta et al. |
| 7,530,105 B2 | 5/2009 | Gilbert et al. |
| 7,657,406 B2 | 2/2010 | Tolone et al. |
| 7,698,213 B2 | 4/2010 | Lancaster |

(Continued)

FOREIGN PATENT DOCUMENTS

| | | |
|---|---|---|
| WO | 2001063534 A2 | 8/2001 |
| WO | 2014159150 A1 | 10/2014 |
| WO | 2017075543 A1 | 5/2017 |

OTHER PUBLICATIONS

Matthiaslohr, Provide a method Peer.close(), Mar. 27, 2013.
Microsoft; What's new in Kerberos Authentication, Aug. 31, 2016.

*Primary Examiner* — Kris E Mackes
(74) *Attorney, Agent, or Firm* — Galvin Patent Law LLC; Brian R Galvin

(57) ABSTRACT

A system for corporate plan determination and validation employing an advanced decision platform comprises a data retrieval module configured to retrieve cooperative venture related data such as financial, operations and historical data related to the current cooperative plan. A predictive analytics module performs predictive risk functions on venture related data. A predictive simulation module performs predictive simulation functions on risk, operations, and financial data. An interactive display module displays the results of predictive analytics and predictive simulation according to pre-designated specifications of the analysts.

36 Claims, 7 Drawing Sheets

(56) References Cited

U.S. PATENT DOCUMENTS

| | | | |
|---|---|---|---|
| 7,739,653 | B2 | 6/2010 | Venolia |
| 8,065,257 | B2 | 11/2011 | Kuecuekyan |
| 8,145,761 | B2 | 3/2012 | Liu et al. |
| 8,180,854 | B2 | 5/2012 | Schneider |
| 8,281,121 | B2 | 10/2012 | Nath et al. |
| 8,595,262 | B1* | 11/2013 | Hayden .............. G06F 16/2471 370/254 |
| 8,615,800 | B2 | 12/2013 | Baddour et al. |
| 8,677,473 | B2 | 3/2014 | Dennerline et al. |
| 8,788,254 | B2 | 7/2014 | Peloski |
| 8,788,306 | B2 | 7/2014 | Delurgio et al. |
| 8,793,758 | B2 | 7/2014 | Raleigh et al. |
| 8,856,936 | B2 | 10/2014 | Ray et al. |
| 8,914,878 | B2 | 12/2014 | Burns et al. |
| 8,990,392 | B1 | 3/2015 | Stamos |
| 8,997,233 | B2 | 3/2015 | Green et al. |
| 9,020,802 | B1 | 4/2015 | Florissi et al. |
| 9,092,616 | B2 | 7/2015 | Kumar et al. |
| 9,122,694 | B1 | 9/2015 | Dukes et al. |
| 9,134,966 | B2 | 9/2015 | Brock et al. |
| 9,137,131 | B1 | 9/2015 | Sarukkai et al. |
| 9,141,360 | B1 | 9/2015 | Chen et al. |
| 9,231,962 | B1 | 1/2016 | Yen et al. |
| 9,299,029 | B1 | 3/2016 | Kim |
| 9,319,430 | B2 | 4/2016 | Bell, Jr. et al. |
| 9,350,550 | B2 | 5/2016 | Nix |
| 9,357,381 | B2 | 5/2016 | Cho et al. |
| 9,384,345 | B2 | 7/2016 | Dixon et al. |
| 9,426,118 | B2 | 8/2016 | Kim |
| 9,451,462 | B2 | 9/2016 | Kim et al. |
| 9,503,470 | B2 | 11/2016 | Gertner et al. |
| 9,571,510 | B1 | 2/2017 | Shen et al. |
| 9,602,530 | B2 | 3/2017 | Ellis et al. |
| 9,654,495 | B2 | 5/2017 | Hubbard et al. |
| 9,672,355 | B2 | 6/2017 | Titonis et al. |
| 9,686,308 | B1 | 6/2017 | Srivastava |
| 9,762,443 | B2 | 9/2017 | Dickey |
| 9,811,794 | B2* | 11/2017 | Mun .................. G06Q 10/0635 |
| 9,887,933 | B2 | 2/2018 | Lawrence, III |
| 9,946,517 | B2 | 4/2018 | Talby et al. |
| 9,967,334 | B2 | 5/2018 | Ford |
| 10,061,635 | B2 | 8/2018 | Ellwein |
| 10,200,233 | B2 | 2/2019 | Anderson et al. |
| 10,210,246 | B2 | 2/2019 | Stojanovic et al. |
| 10,210,255 | B2 | 2/2019 | Crabtree et al. |
| 10,216,485 | B2 | 2/2019 | Misra et al. |
| 10,242,406 | B2 | 3/2019 | Kumar et al. |
| 10,248,910 | B2 | 4/2019 | Crabtree et al. |
| 10,262,321 | B1 | 4/2019 | Ramanathan et al. |
| 10,318,882 | B2 | 6/2019 | Brueckner et al. |
| 10,320,828 | B1 | 6/2019 | Derbeko et al. |
| 10,367,829 | B2 | 7/2019 | Huang et al. |
| 10,511,498 | B1 | 12/2019 | Narayan et al. |
| 10,831,838 | B2 | 11/2020 | Kraning et al. |
| 11,017,096 | B2 | 5/2021 | Tsokos et al. |
| 2003/0115080 | A1 | 6/2003 | Kasravi et al. |
| 2004/0010491 | A1 | 1/2004 | Riedinger |
| 2004/0255167 | A1 | 12/2004 | Knight |
| 2005/0000165 | A1 | 1/2005 | Dischinat et al. |
| 2005/0289072 | A1 | 12/2005 | Sabharwal |
| 2006/0100958 | A1 | 5/2006 | Cheng et al. |
| 2006/0149575 | A1 | 7/2006 | Varadarajan et al. |
| 2007/0012161 | A1 | 1/2007 | Lyles |
| 2007/0021955 | A1 | 1/2007 | Tolone et al. |
| 2007/0043656 | A1 | 2/2007 | Lancaster |
| 2007/0226796 | A1 | 9/2007 | Gilbert et al. |
| 2008/0027690 | A1 | 1/2008 | Watts |
| 2008/0091757 | A1 | 4/2008 | Ingrassia et al. |
| 2008/0172353 | A1 | 7/2008 | Lim et al. |
| 2009/0018996 | A1 | 1/2009 | Hunt et al. |
| 2009/0064088 | A1 | 3/2009 | Barcia et al. |
| 2009/0089227 | A1 | 4/2009 | Sturrock et al. |
| 2009/0222562 | A1 | 9/2009 | Liu et al. |
| 2009/0293128 | A1 | 11/2009 | Lippmann et al. |
| 2010/0042846 | A1 | 2/2010 | Trotter et al. |
| 2010/0180337 | A1 | 7/2010 | Bajekal |
| 2010/0185579 | A1 | 7/2010 | Hong et al. |
| 2010/0205588 | A1 | 8/2010 | Yu et al. |
| 2010/0228693 | A1 | 9/2010 | Dawson et al. |
| 2011/0054860 | A1 | 3/2011 | Guild et al. |
| 2011/0060821 | A1 | 3/2011 | Loizeaux et al. |
| 2011/0154341 | A1 | 6/2011 | Pueyo et al. |
| 2011/0208681 | A1 | 8/2011 | Kuecuekyan |
| 2012/0030757 | A1 | 2/2012 | Baikalov et al. |
| 2012/0266244 | A1 | 10/2012 | Green et al. |
| 2012/0303396 | A1 | 11/2012 | Winkler et al. |
| 2013/0041921 | A1 | 2/2013 | Cooper et al. |
| 2013/0073062 | A1 | 3/2013 | Smith et al. |
| 2013/0073686 | A1 | 3/2013 | Sandholm |
| 2013/0111592 | A1 | 5/2013 | Zhu et al. |
| 2013/0117852 | A1 | 5/2013 | Stute |
| 2013/0132149 | A1 | 5/2013 | Wei et al. |
| 2013/0179982 | A1 | 7/2013 | Bridges et al. |
| 2013/0191416 | A1 | 7/2013 | Lee et al. |
| 2013/0246996 | A1 | 9/2013 | Duggal et al. |
| 2013/0304623 | A1 | 11/2013 | Kumar et al. |
| 2013/0346354 | A1 | 12/2013 | Mizell et al. |
| 2014/0074826 | A1 | 3/2014 | Cooper et al. |
| 2014/0156806 | A1 | 6/2014 | Karpistsenko et al. |
| 2014/0201221 | A1 | 7/2014 | Eden et al. |
| 2014/0237599 | A1 | 8/2014 | Gertner et al. |
| 2014/0244612 | A1 | 8/2014 | Bhasin et al. |
| 2014/0245376 | A1* | 8/2014 | Hibbert ................ G06F 21/554 726/1 |
| 2014/0245443 | A1 | 8/2014 | Chakraborty |
| 2014/0274022 | A1 | 9/2014 | Bell et al. |
| 2014/0279762 | A1 | 9/2014 | Xaypanya et al. |
| 2014/0358911 | A1 | 12/2014 | McCarthy et al. |
| 2014/0359552 | A1 | 12/2014 | Misra et al. |
| 2014/0365938 | A1 | 12/2014 | Black et al. |
| 2015/0020199 | A1 | 1/2015 | Neil et al. |
| 2015/0095303 | A1 | 4/2015 | Sonmez et al. |
| 2015/0106941 | A1 | 4/2015 | Muller et al. |
| 2015/0149979 | A1 | 5/2015 | Talby et al. |
| 2015/0163242 | A1 | 6/2015 | Laidlaw et al. |
| 2015/0169294 | A1 | 6/2015 | Brock et al. |
| 2015/0186427 | A1 | 7/2015 | Logothetis et al. |
| 2015/0195192 | A1 | 7/2015 | Vasseur et al. |
| 2015/0236935 | A1 | 8/2015 | Bassett |
| 2015/0339263 | A1 | 11/2015 | Ata et al. |
| 2015/0347414 | A1 | 12/2015 | Xiao et al. |
| 2015/0370811 | A1 | 12/2015 | Ding et al. |
| 2015/0371224 | A1 | 12/2015 | Lingappa |
| 2015/0379072 | A1 | 12/2015 | Dirac et al. |
| 2015/0379424 | A1 | 12/2015 | Dirac et al. |
| 2016/0004858 | A1 | 1/2016 | Chen et al. |
| 2016/0006629 | A1 | 1/2016 | Tanakiev et al. |
| 2016/0028758 | A1 | 1/2016 | Ellis et al. |
| 2016/0078361 | A1 | 3/2016 | Brueckner et al. |
| 2016/0080399 | A1 | 3/2016 | Harris et al. |
| 2016/0086275 | A1* | 3/2016 | Adler .................... G06Q 40/04 705/37 |
| 2016/0092557 | A1 | 3/2016 | Stojanovic et al. |
| 2016/0099960 | A1 | 4/2016 | Gerritz et al. |
| 2016/0105454 | A1 | 4/2016 | Li et al. |
| 2016/0140446 | A1 | 5/2016 | Adderly et al. |
| 2016/0140519 | A1 | 5/2016 | Trepca et al. |
| 2016/0164905 | A1 | 6/2016 | Wood et al. |
| 2016/0179945 | A1 | 6/2016 | Lastra Diaz et al. |
| 2016/0203448 | A1 | 7/2016 | Metnick et al. |
| 2016/0241580 | A1 | 8/2016 | Watters et al. |
| 2016/0241581 | A1 | 8/2016 | Watters et al. |
| 2016/0275123 | A1 | 9/2016 | Lin et al. |
| 2016/0285732 | A1 | 9/2016 | Brech et al. |
| 2016/0342606 | A1 | 11/2016 | Mouel et al. |
| 2016/0350442 | A1 | 12/2016 | Crosby |
| 2016/0364925 | A1 | 12/2016 | Garg et al. |
| 2016/0371618 | A1* | 12/2016 | Leidner ............... G06F 16/2246 |
| 2017/0019678 | A1 | 1/2017 | Kim et al. |
| 2017/0063896 | A1 | 3/2017 | Muddu et al. |
| 2017/0083380 | A1 | 3/2017 | Bishop et al. |
| 2017/0126712 | A1 | 5/2017 | Crabtree et al. |
| 2017/0139763 | A1 | 5/2017 | Ellwein |
| 2017/0149802 | A1 | 5/2017 | Huang et al. |

(56) References Cited

U.S. PATENT DOCUMENTS

| | | |
|---|---|---|
| 2017/0193110 A1 | 7/2017 | Crabtree et al. |
| 2017/0206360 A1 | 7/2017 | Brucker et al. |
| 2017/0322959 A1 | 11/2017 | Tidwell et al. |
| 2017/0323089 A1 | 11/2017 | Duggal et al. |
| 2018/0144243 A1 | 5/2018 | Hsieh et al. |
| 2018/0197128 A1 | 7/2018 | Carstens et al. |
| 2018/0288085 A1 | 10/2018 | Hailpern et al. |
| 2018/0300930 A1 | 10/2018 | Kennedy et al. |
| 2018/0373766 A1* | 12/2018 | Crabtree ............ H04L 63/0421 |
| 2019/0082305 A1 | 3/2019 | Proctor |
| 2019/0095533 A1 | 3/2019 | Levine et al. |
| 2020/0043113 A1* | 2/2020 | DePalma .............. G06F 40/289 |
| 2020/0104958 A1* | 4/2020 | Cheng-Shorland .......................... G06Q 10/101 |

\* cited by examiner

INTELLIGENT AUTOMATED PLANNING SYSTEM FOR LARGE-SCALE OPERATIONS

CROSS-REFERENCE TO RELATED APPLICATIONS

Priority is claimed in the application data sheet to the following patents or patent applications, each of which is expressly incorporated herein by reference in its entirety:
Ser. No. 17/106,997
Ser. No. 15/931,534
Ser. No. 16/777,270
Ser. No. 16/720,383
Ser. No. 15/823,363
Ser. No. 15/725,274
Ser. No. 15/655,113
Ser. No. 15/237,625
Ser. No. 15/206,195
Ser. No. 15/186,453
Ser. No. 15/166,158
Ser. No. 15/141,752
Ser. No. 15/091,563
Ser. No. 14/986,536
Ser. No. 14/925,974
Ser. No. 15/683,765
Ser. No. 15/409,510
Ser. No. 15/379,899
Ser. No. 15/376,657
Ser. No. 16/718,906
Ser. No. 15/879,182
Ser. No. 15/850,037
Ser. No. 15/673,368
Ser. No. 15/489,716
Ser. No. 15/905,041
Ser. No. 16/191,054
Ser. No. 16/654,309
Ser. No. 15/847,443
Ser. No. 15/790,457
62/568,298
Ser. No. 15/790,327
62/568,291
Ser. No. 15/616,427
Ser. No. 16/660,727
Ser. No. 15/229,476

BACKGROUND OF THE INVENTION

Field of the Invention

The present invention is in the field of use of computer systems in operations planning. Specifically, the use of an intelligent automated planning system to optimize large-scale operations while managing risk predictively.

Discussion of the State of the Art

Interactions between two or more corporations to advance business needs and profitability have been occurring throughout recorded history. These interactions may be as simple as one company entering into an agreement to provide the service of handling another company's payroll or entering into an agreement to make parts for another company's finished product. More complex multi-corporation interactions may be for one company to serve as a second manufacturing source for one or more items in another company's product line, acting as sole mass manufacturer of a portion of or the entirety of another company's product line, buy or rent infrastructure such as buildings from another company, or providing skilled workers for portions of another company's workforce. Perhaps most complex is the merging of two separate companies into a single entity. In these cases of interaction, however, thousands to millions of factors, some derivative of environmental influences outside both corporations' control must be identified and analyzed to predict the success of the venture. Perhaps due to the ramifications of failure for both corporations when multi-corporation interaction is attempted, the term used to describe the summation of all known factors for their detrimental or positive influence on the success of the intended venture is risk.

Attempts to accurately measure and manage risk have been present probably nearly as long as interpersonal agreements of value have been occurring. Actuarial risk tables have been used for over a century by the insurance trade. Investors look at perspective investments' past financials, current leadership, current product lines, press releases among other items to draw conclusions before investing in hopes of maximizing return. Before entering contracts with other companies to cooperate in product manufacture, joint product development or exchange of services, both companies will attempt to ensure that the other has the resources, knowledge and finances to complete the planned cooperative venture with a positive return for them. Corporate mergers are an extreme possibly most complex form of multi-corporation venture. Mergers require a very high level of due diligence in areas such as but not limited to: in depth financials for both companies, product overlap, manufacturing facility characteristics, including geography, current economics related to product lines, the distribution of technology within the new company, changes required to corporate management structures and even the differences in corporate operational styles, among hundreds, thousands or even millions of other factors either related to or unrelated to those just mentioned, must be carefully and correctly analyzed, possibly predictively manipulated within certain tolerances to simulate market conditions and then correctly and predictively acted upon to confirm probability of general success and structure a merger plan that provides the best probability of a positive outcome.

While inter-corporate cooperative ventures have been successfully occurring successfully for more than two centuries, for larger corporate entities which may have multiple divisions in multiple geographical regions leading to extremely complex financial data, extremely complex operational data and little time or capital for failure. On top of this there are significant pressures that neither company entering into an agreement whether it be to simply act as a second source for a particular product line, or an agreement provide and accept skilled workers between them, may control but which may significantly affect the "risk", or probability of success of the venture. The complexity of the climate has gotten to the point where the groups of experts that may be assigned to research the risk of a particular venture cannot isolate, process analyze and form highly accurate predictive opinions and plans for ventures under consideration due to the volume of pertinent information and the presence of intricate interrelationships between seemingly independent facts within the whole. Evidence that this level of investigation may be ineffective is provided by two highly publicized company mergers which failed due to predictable post-merger conditions that were either missed or overly discounted, both leading to billions in lost assets. The first, Time Warner and America On Line (AOL) had fantastic starting financials, with AOL being the significant powerhouse in this area, both were in a growth industry, information technology, and both appeared to have complementary services and products that when combined would create a company stronger than the sum of the two individuals alone. Unfortunately, the investigators from the two companies missed or dismissed data that resulted in the merger's failure. Among other factors, AOL was the top supplier of a service, dial-up internet, old-technology near the end of its profitable lifespan, that was already rapidly being supplanted by newer technology, broadband; the merger was arranged and enacted during what has come to be known as a technology bubble in the investment market which had begun to destabilize before the merger had been committed to; last, the corporate cultures of AOL and Time Warner were significantly different and failure to address or adequately plan for corporate personnel infrastructure integration very significantly hindered the success of the venture. Billions of dollars were lost and the merger is, in hindsight, deemed a significant failure. Another example in this highly visible bracket is that of Chrysler Motors and Daimler-Benz. Both had seemingly sound financials at the onset, their main geographical areas of operation as well as their markets appeared complementary with Daimler wanting to make in-roads into moderately priced automobiles and Chrysler benefiting from Daimler's technological innovations. However, the researchers failed to integrate the escalating trend of competition in Chrysler's market from Southeast Asia, which significantly reduced Chrysler's sales far below their projections for successful merger; their again was no pressing need seen for corporate executive integration which great hindered decision making during a critical period and there was also not nearly enough attention given to technology sharing and human resource cooperation between the two newly created divisions. Together these missed or discounted factors led to failure costing billions of dollars with Chrysler eventually being sold to a venture capital group by Daimler-Benz for a fraction of original outlay. In both the cases of the AOL-Time Warner merger and the Chrysler-Daimler-Benz merger two highly important issues may be cited: First, important market trend information was either not recognized or not given enough importance in the overwhelming body of data available and these factors not appropriately used in risk calculations; Second, the significant role of workforce, including executive level human resource integration, was not recognized or downplayed and a proper level of planning not developed. Both of these problem area's might also have significantly suffered from human emotional failure as those invested in these companies might downplay the very data that caused these large ventures to fail.

Interim and current use of computer technology in the area of multi-corporation co-operative ventures has been little more than committing the old style actuarial tables into electronic form and the ability to perform a number of more complex computational models on data that is manually found and either entered or specifically pointed to by the analysts of risk study for the venture. Predictions from the results of these computations are then largely left to the study analysts. True innovation, where a system may intelligently retrieve current and historical data related to an multi-corporation cooperative interaction from a large plurality of different business data sources (e.g., including both structured data such as accounting data and "dark" data such as all the real/random business data), run multiple predictive analytical functions on it, run multiple data variant simulations on the resulting models and then present those machine generated results to the risk analysts for the study is not currently available.

There have been several recent developments in more general business software that have arisen with the purpose of streamlining or automating either business data analysis or business decision process which might be harnessed to aid in investment trade decision making PALANTIR™ offers software to isolate patterns in large volumes of data, DATABRICKS™ offers custom analytics services, ANAPLAN™ offers financial impact calculation services. There are other software sources that mitigate some aspect of business data relevancy identification in isolation, but these fail to holistically address the entire scope of cooperative venture data analysis. Analysis of that data and business decision automation, however, remains out of their reach. Currently, none of these solutions handle more than a single aspect of the whole task, cannot form predictive analytic data transformations and, therefore, are of little use in the area of multi-corporation venture risk, where the only solution is a very complex process requiring sophisticated integration of the tools above.

As stated, while the ability to retrieve large amounts of data has greatly increased and there are packages that purport to aid venture risk analysts better command the wealth of venture related support information they only serve to add to the overload of information described above, and, to be of optimal use, must be carefully analyzed by any business information management system purporting to provide reliable venture risk field prediction.

What is needed is a fully integrated, intelligent automated planning system that retrieves financial, market boundary, market trend, infrastructure and workforce, including corporate culture relevant information among other factors not listed for brevity, from many heterogeneous sources using a scalable, expressively scriptable, connection interface, identifies and analyzes that high volume data, transforming it into a useful format. Such a system must then use that data to drive an integrated, highly scalable simulation engine which may employ combinations of the system dynamics, discrete event and agent based paradigms within a simulation run such that the most useful and accurate data transformations are obtained and stored for the human analysts such as venture risk analysts and financial officers to rapidly digest the presented information, readily comprehend any predictions or recommendations and then creatively respond to optimize smooth and efficient venture advancement that maximizes business interests including profit. This multi-method multi-corporation cooperative venture information capture, analysis, transformation, outcome prediction, and presentation system forming a "business operating system."

SUMMARY OF THE INVENTION

Accordingly, the inventor has invented and reduced to practice a system for intelligent automated planning of large-scale operations. In a typical embodiment, the system for intelligent automated planning of large-scale operations, a specifically programmed usage of the business operating system, retrieves data related to financial status and soundness of the participant venture corporations, economic trends that may affect one or more of the participants, manufacturing infrastructure options between participants, current product offerings of the participants, corporate culture present at each venture participant, management infrastructure and environmental factors such as general population characteristics of those living near sites likely to be affected by the venture. The system then uses this and other data to formulate the probable benefits of the pending inter-corporation cooperative venture and risk factors associated with the venture which may be a diverse as financial burdens to each participant to fulfill their stipulations versus profit expected, projected market for the products or services to be offered during and post expected capital outlay recuperation and subsequent profitability period, significant, benefit eliminating clashes between participant workforce and management structures and community resistance to changes, such as but not limited to new roads, increased truck or car traffic, odor release and new infrastructure. The system may also use that data to create predictive simulations concerning future performance and risk having to do with the intended venture planning such as whether to implement the plan, how to best implement the plan, best practice management and workforce preparation, how to best spend limited capital improvement funds to gain highest chance of success and profitability among other factors. The ability of the business operating system to capture, clean, and normalize data then to perform advanced predictive analytic functions and predictive simulations, alerting decision makers of deviations found from established normal operations, possibly providing recommendations in addition to analyzing all relevant asset and risk data to assist the client in formulating the most informed inter-corporation cooperative venture plan based upon a far greater volume of data than the client could analyze alone, thus performing the less crucial filtering and correlation of the data and leaving the informed creative decision making to the clients.

According to a preferred embodiment of the invention, a system for intelligent automated planning of large-scale operations has been devised employing an advanced decision platform comprising a predictive risk analyzer subsystem stored in a memory of and operating on a processor of a computing device and configured to: receive normalized parameters completely describing a current multi-corporation venture plan, to retrieve normalized financial data for each corporation party to the current multi-corporation venture plan from a large plurality of sources for use in predictive simulation algorithms to retrieve normalized operations related data for each corporation party to the current multi-corporation venture plan from a large plurality of sources for use in predictive simulation algorithms, to retrieve normalized data resulting from previous multi-corporation ventures determined by comparative analysis functions to be analogous to current multi-corporation venture for use in predictive simulation algorithms, perform a plurality of predictive analytic and simulation functions on the at least a portion of the parameters completely describing the current multi-corporation venture plan, at least a portion of the financial data for each corporation party to the current multi-corporation venture plan, at least a portion of the operations related data for each corporation party to the current multi-corporation venture plan, and at least a portion of the data resulting from previous multi-corporation ventures and store at least a portion of the results of a predictive simulation analysis of at least a portion of the parameters completely describing the current multi-corporation venture plan, at least a portion of the operations related data for each corporation party to the current multi-corporation venture plan, and at least a portion of the data resulting from previous multi-corporation ventures including predicted best interaction practices during the current multi-corporation venture plan and predicted pitfalls or risks of the current multi-corporation venture plan. The system also comprising an interactive terminal module stored in a memory of and operating on a processor of a computing device and configured to: permit entry of at least one parameter describing the current multi-corporation venture plan at a plurality of steps during predictive simulation analysis and display results of predictive simulation analysis as pre-programmed by analysts of an investigation.

According to a preferred embodiment of the invention, a system for intelligent automated planning of large-scale operations has been devised wherein the predictive risk analyzer subsystem uses natural language processing to analyze the text of at least one existing contract to extract contract primitives as part of its contract analysis, wherein the predictive venture outcome analyzer module is used to intelligently determine the valuation (as well as maximum liability for a counterparty) of at least one existing contract or contract portfolio, wherein the predictive venture outcome analyzer module is used to intelligently renegotiate or optimize at least one contract in a portfolio of contracts between corporation parties in at least one multi-corporation venture plan using existing contract instruments as input, wherein the predictive venture outcome analyzer module is used to intelligently renegotiate or optimize at least one contract between corporation parties in at least one multi-corporation venture plan using existing an existing contract instrument as input, wherein the predictive venture outcome analyzer module is used to automatically negotiate contract terms for at least two system subscriber parties entering into a multi-corporation venture using difference estimation analytics such that resultant contract conversion requires only automated predictive analytics generated contract term acceptance by human representatives of the system subscriber parties entering into the multi-corporation venture.

According to a preferred embodiment of the invention, a method for intelligent automated planning of large-scale operations has been devised employing the steps of: a) receiving normalized parameters completely describing a current multi-corporation venture plan; b) retrieving normalized operations related data for each corporation party to the current multi-corporation venture plan from a large plurality of sources for use in predictive simulation algorithms; c) retrieving normalized data resulting from previous multi-corporation ventures determined by comparative analysis functions to be analogous to current multi-corporation venture from a large plurality of sources for use in predictive simulation algorithms; d) performing a plurality of predictive simulation functions on the at least a portion of the parameters completely describing the current multi-corporation venture plan, at least a portion of the operations related data for each corporation party to the current multi-corporation venture plan, and at least a portion of the data resulting from previous multi-corporation ventures using a predictive venture outcome analyzer module; and e) displaying results of investment vehicle analysis in a plurality of investigator determined views using an interactive terminal module.

According to a preferred embodiment of the invention, a computing system for prediction of future performance of large-scale operations and to manage financial, operational and market execution risk employing an intelligent automated planning system, the computing system comprising: one or more hardware processor configured for:_instantiating a distributed directed computational graph comprising nodes representing data transformations and edges representing messages between the nodes, wherein: the directed computational graph comprises a data processing workflow for analyzing a large-scale operational plan and associated risk factors based on market, operations and financial data retrieved over the web from both corporate operations data stores and other exogenous sources; and the data transformation of one or more of the nodes comprises receipt of data from at least one physical or virtual sensor or application telemetry source; storing the directed computational graph specified processing workflow; performing a plurality of analytic and simulation computations as directed by the data processing workflow of the directed computational graph; producing a first result comprising a plurality of estimated future states of the large-scale operational plan under at least one scenario over a finite time horizon; and producing a second result comprising at least one additional scenario and a second plurality of estimated future states associated with it, and a plurality of associated risk factors and their impact on the first and second pluralities of estimated future states.

According to a preferred embodiment of the invention, a computer implemented method executed on an intelligent automated planning system for prediction of future performance of large-scale operations and to manage financial, operational and market execution risk, the computer implemented method comprising: instantiating a distributed directed computational graph comprising nodes representing data transformations and edges representing messages between the nodes, wherein: the directed computational graph comprises a data processing workflow for analyzing a large-scale operational plan and associated risk factors based on market, operations and financial data retrieved over the web from both corporate operations data stores and analogous previous venture outcome data stores; and the data transformation of one or more of the nodes comprises receipt of data from a physical sensor; storing the directed computational graph specified processing workflow; performing a plurality of analytic and simulation computations as directed by the data processing workflow of the directed computational graph; producing a first result comprising a plurality of estimated future states of the large-scale operational plan under at least one scenario over a finite time horizon; and producing a second result comprising at least one additional scenario and a second plurality of estimated future states associated with it, and a plurality of associated risk factors and their impact on the first and second pluralities of estimated future states.

According to a preferred embodiment of the invention, a system for prediction of future performance of large-scale operations and to manage financial, operational and market execution risk employing an intelligent automated planning system, comprising one or more computers with executable instructions that, when executed, cause the system to:_instantiating a distributed directed computational graph comprising nodes representing data transformations and edges representing messages between the nodes, wherein: the directed computational graph comprises a data processing workflow for analyzing a large-scale operational plan and associated risk factors based on market, operations and financial data retrieved over the web from both corporate operations data stores and other exogenous sources; and_the data transformation of one or more of the nodes comprises receipt of data from at least one physical or virtual sensor or application telemetry source; storing the directed computational graph specified processing workflow; performing a plurality of analytic and simulation computations as directed by the data processing workflow of the directed computational graph; producing a first result comprising a plurality of estimated future states of the large-scale operational plan under at least one scenario over a finite time horizon; and producing a second result comprising at least one additional scenario and a second plurality of estimated future states associated with it, and a plurality of associated risk factors and their impact on the first and second pluralities of estimated future states.

According to a preferred embodiment of the invention, non-transitory, computer-readable storage media having computer-executable instructions embodied thereon that, when executed by one or more processors of a computing system employing an intelligent automated planning system for prediction of future performance of large-scale operations and to manage financial, operational and market execution risk, cause the computing system to: instantiate a distributed directed computational graph comprising nodes representing data transformations and edges representing messages between the nodes, wherein: the directed computational graph comprises a data processing workflow for analyzing a large-scale operational plan and associated risk factors based on market, operations and financial data retrieved over the web from both corporate operations data stores and other exogenous sources; and the data transformation of one or more of the nodes comprises receipt of data from at least one physical or virtual sensor or application telemetry source; store the directed computational graph specified processing workflow; perform a plurality of analytic and simulation computations as directed by the data processing workflow of the directed computational graph; produce a first result comprising a plurality of estimated future states of the large-scale operational plan under at least one scenario over a finite time horizon; and produce a second result comprising at least one additional scenario and a second plurality of estimated future states associated with it, and a plurality of associated risk factors and their impact on the first and second pluralities of estimated future states.

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION OF THE INVENTION

Figure 1:
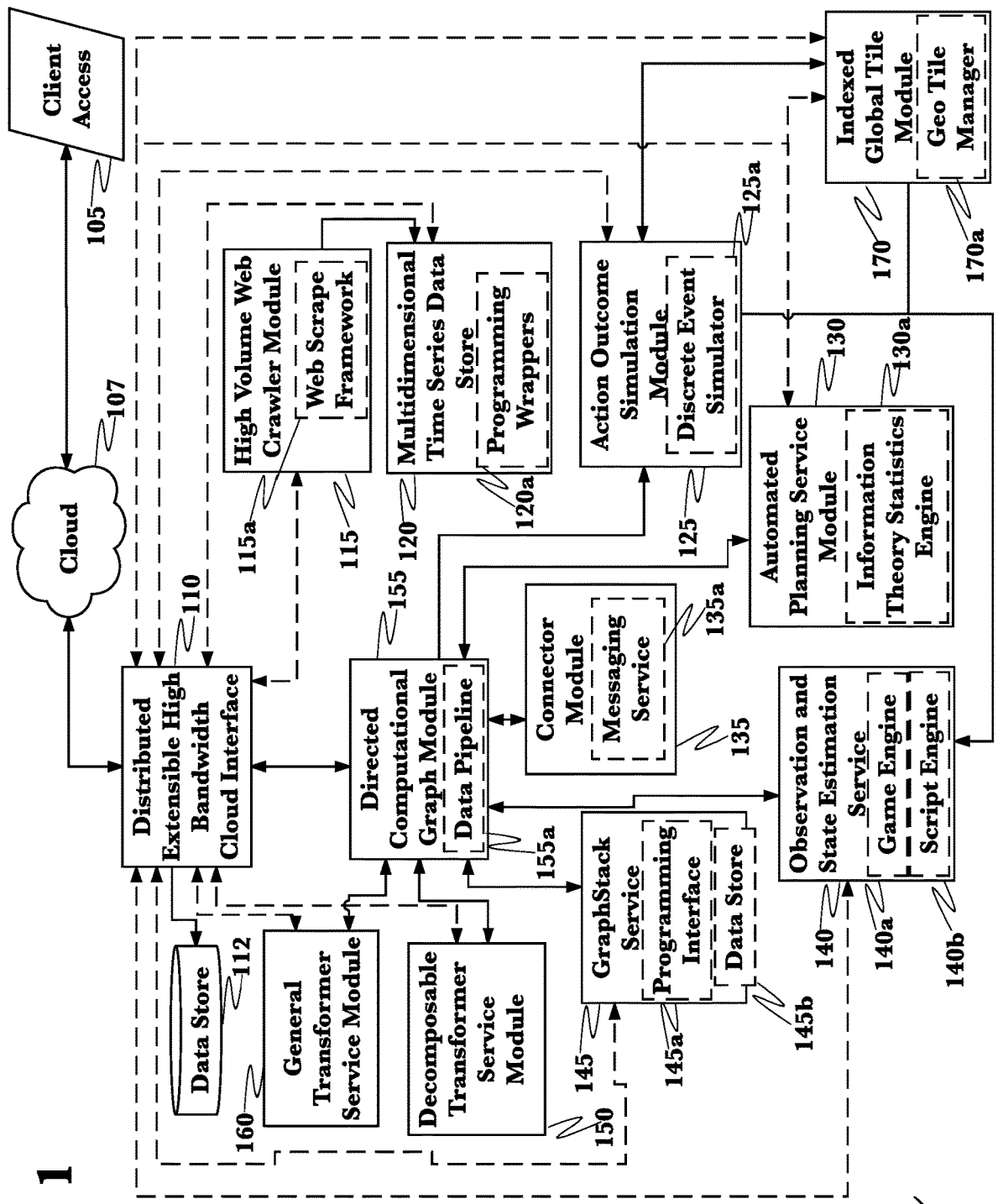
FIG. 1 is a diagram of an exemplary architecture of a business operating system according to an embodiment of the invention.

The inventor has conceived, and reduced to practice, a system and method for multi-corporation cooperative interaction plan validation employing an advanced decision platform.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring sequentially (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple manifestations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Program functions and capabilities are not always attributed to a named software set or library. This in no instance implies that such a specific program, program function, or code library is not employed but is meant to allow time progression based changes to be made. In all cases at least one open source or proprietary software package providing the attributed functional result may be available and known to those skilled in the art or the algorithm needed to accomplish the function determinable by those skilled in the art.

Conceptual Architecture

FIG. 1 is a diagram of an exemplary architecture of a business operating system 100 according to an embodiment of the invention. Client access to the system 105 for specific data entry, system control and for interaction with system output such as automated predictive decision making and planning and alternate pathway simulations, occurs through the system's distributed, extensible high bandwidth cloud interface 110 which uses a versatile, robust web application driven interface for both input and display of client-facing information and a data store 112 such as, but not limited to MONGODB™, COUCHDB™, CASSANDRA™ or REDIS™ depending on the embodiment. Much of the business data analyzed by the system both from sources within the confines of the client business, and from cloud based sources 107, public or proprietary such as, but not limited to: subscribed business field specific data services, external remote sensors, subscribed satellite image and data feeds and web sites of interest to business operations both general and field specific, also enter the system through the cloud interface 110, data being passed to the connector module 135 which may possess the API routines 135a needed to accept and convert the external data and then pass the normalized information to other analysis and transformation components of the system, the directed computational graph module 155, high volume web crawler module 115, multidimensional time series database 120 and the graph stack service 145. The directed computational graph module 155 retrieves one or more streams of data from a plurality of sources, which includes, but is not limited to, a plurality of physical sensors, network service providers, web based questionnaires and surveys, monitoring of electronic infrastructure, crowd sourcing campaigns, and human input device information. Within the directed computational graph module 155, data may be split into two identical streams in a specialized pre-programmed data pipeline 155a, wherein one sub-stream may be sent for batch processing and storage while the other sub-stream may be reformatted for transformation pipeline analysis. The data is then transferred to the general transformer service module 160 for linear data transformation as part of analysis or the decomposable transformer service module 150 for branching or iterative transformations that are part of analysis. The directed computational graph module 155 represents all data as directed graphs where the transformations are nodes and the result messages between transformations edges of the graph. The high volume web crawling module 115 uses multiple server hosted preprogrammed web spiders, which while autonomously configured are deployed within a web scraping framework 115a of which SCRAPY™ is an example, to identify and retrieve data of interest from web based sources that are not well tagged by conventional web crawling technology. The multiple dimension time series data store module 120 may receive streaming data from a large plurality of sensors that may be of several different types. The multiple dimension time series data store module may also store any time series data encountered by the system such as but not limited to environmental factors at cooperative venture participant client infrastructure sites, component sensor readings and system logs of all venture participant client equipment, weather and catastrophic event reports for all regions an venture participant client occupies, political communiques from regions hosting venture participant client infrastructure and network service information captures such as, but not limited to general, business and technology news, capital funding opportunities and financial feeds, and sales, market conditions and trends, and service related customer data. The module is designed to accommodate irregular and high volume surges by dynamically allotting network bandwidth and server processing channels to process the incoming data. Inclusion of programming wrappers for languages examples of which are, but not limited to C++, PERL, PYTHON, and ERLANG™ allows sophisticated programming logic to be added to the default function of the multidimensional time series database 120 without intimate knowledge of the core programming, greatly extending breadth of function. Data retrieved by the multidimensional time series database 120 and the high volume web crawling module 115 may be further analyzed and transformed into task optimized results by the directed computational graph 155 and associated general transformer service 150 and decomposable transformer service 160 modules. Alternately, data from the multidimensional time series database and high volume web crawling modules may be sent, often with scripted cuing information determining important vertexes 145a, to the graph stack service module 145 which, employing standardized protocols for converting streams of information into graph representations of that data, for example, open graph internet technology although the invention is not reliant on any one standard. Through the steps, the graph stack service module 145 represents data in graphical form influenced by any pre-determined scripted modifications 145a and stores it in a graph-based data store 145b such as GIRAPH™ or a key value pair type data store REDIS™, or RIAK™, among others, all of which are suitable for storing graph-based information.

Results of the transformative analysis process may then be combined with further client directives, additional business rules and practices relevant to the analysis and situational information external to the already available data in the automated planning service module 130 which also runs powerful information theory 130a based predictive statistics functions and machine learning algorithms to allow future trends and outcomes to be rapidly forecast based upon the current system derived results and choosing each a plurality of possible business decisions. Using all available data, the automated planning service module 130 may propose business decisions most likely to result is the most favorable business outcome with a usably high level of certainty. Closely related to the automated planning service module in the use of system derived results in conjunction with possible externally supplied additional information in the assistance of end user business decision making, the action outcome simulation module 125 with its discrete event simulator programming module 125a coupled with the end user facing observation and state estimation service 140 which is highly scriptable 140b as circumstances require and has a game engine 140a to more realistically stage possible outcomes of business decisions under consideration, allows business decision makers to investigate the probable outcomes of choosing one pending course of action over another based upon analysis of the current available data.

A significant proportion of the data that is retrieved and transformed by the business operating system, both in real-world analyses and as predictive simulations that build upon intelligent extrapolations of real-world data, include a geospatial component. The indexed global tile module 170 and its associated geo tile manager 170a manages externally available, standardized geospatial tiles and may provide other components of the business operating system through programming methods to access and manipulate meta-information associated with geospatial tiles and stored by the system. Ability of the business operating system to manipulate this component over the time frame of an analysis and potentially beyond such that, in addition to other discriminators, the data is also tagged, or indexed, with their coordinates of origin on the globe, allows the system to better integrate and store analysis specific information with all available information within the same geographical region. Such ability makes possible not only another layer of transformative capability but, may greatly augment presentation of data by anchoring to geographic images including satellite imagery and superimposed maps both during presentation of real-world data and simulation runs.

Figure 2:
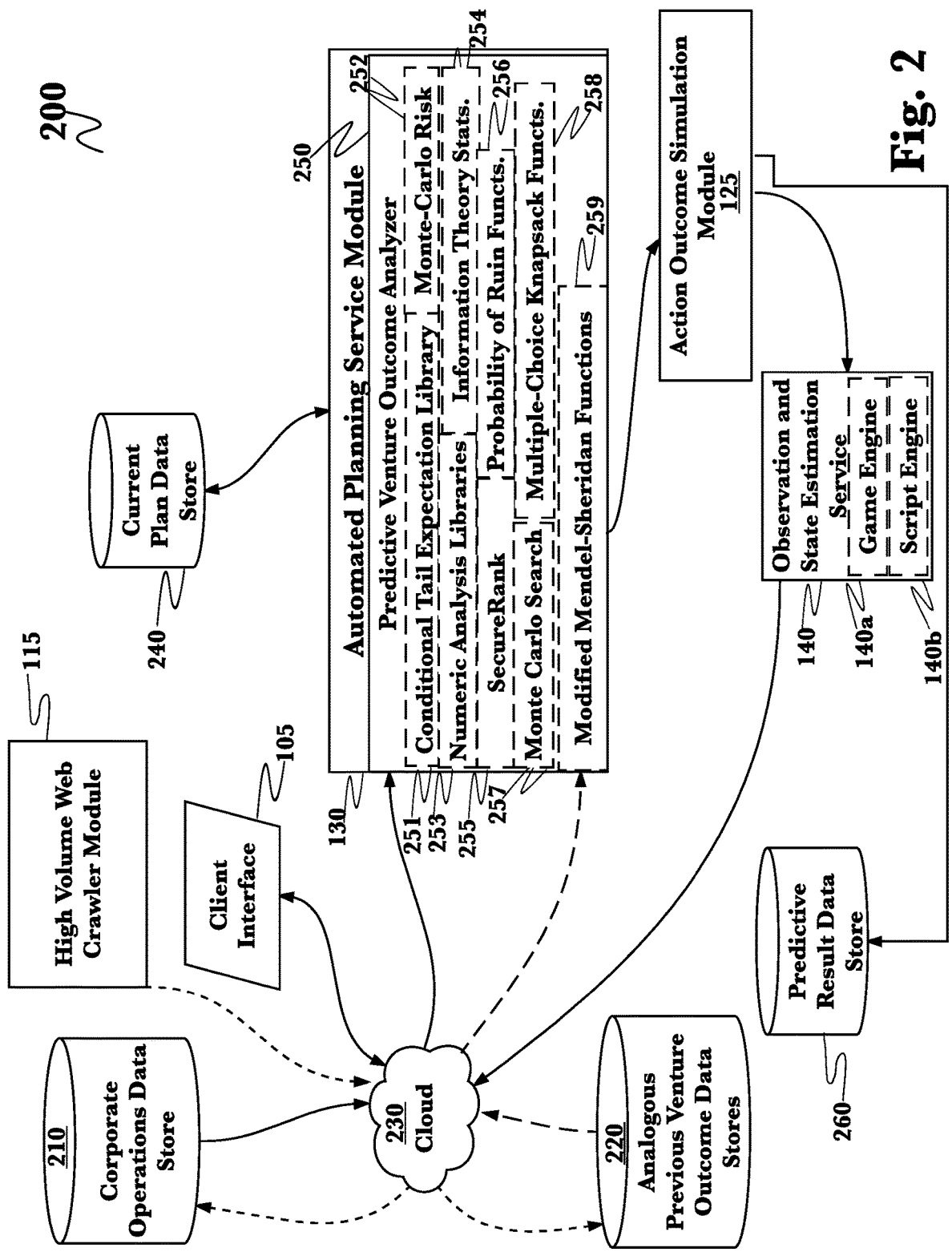
FIG. 2 is a diagram of modules of the business operating system configured specifically for use in intelligent automated planning and risk management, according to an embodiment of the invention.

FIG. 2 is a diagram of modules of the business operating system configured specifically for use in automated planning, according to an embodiment of the invention 200. The business operating system 100 (previously disclosed in co-pending application Ser. No. 15/141,752—now U.S. Pat. No. 10,860,962—and applied in co-pending application Ser. No. 15/237,625—now U.S. Pat. No. 10,248,910), when programmed to operate as an automated planning platform such as for cooperative venture risk planning, is very well suited to perform advanced predictive analytics and predictive simulations using predictive risk analytic subsystem 250 to produce automated planning and outcome predictions and simulations. Much of the venture risk-specific programming functions are added via automated planning service module 130 of modified business operating system 100 to specialize it to perform risk analytics. These specialized libraries together form an engineered software subsystem, predictive risk analytic subsystem 250, that acts to predictively analyze a large plurality of data sets 210 (at least some of which are obtained by high-volume web crawler module 115) related to venture 240 which may include but not be limited to, a scope of the planned venture, expected advantages and outcome of the planned venture, financials of participants, infrastructure available, geographic position of infrastructure elements, executive workforce structures, product lines, workforce distribution, product market conditions, and economic factors, among other factors known to be important by those skilled in the art. Similarly, a large plurality of data 220 (which may be retrieved through the high volume web crawler module of the system 115), related to previous cooperative ventures determined by system 100 to be relevant to the current cooperative venture may be analytically compared to the current venture 240 proposal as part of the predictive risk analytic subsystem 250. Again this data may include but not be limited to scope of the cooperative venture, expected advantages and outcome of venture, financials of participants, infrastructure available, infrastructure geographic position, executive workforce structures, product lines, workforce distribution, product market conditions, and economic factors among other historical factors found important to the eventual outcome by those skilled in the art. Specialized libraries may include but are not limited to conditional tail expectation (CTE) library functions 251 which allow computational normalization of risk data, similar to value-at risk which given a random distribution of loss (L) is a given p-quantile of L, (for example p=95%). Conditional tail expectation is the average loss within the $(1-p)*100\%$ cases. Normalized data such as these may be used in other predictive analytic modules within predictive risk analytic subsystem 250. Monte-Carlo risk routines which predictively attempts to iteratively find the best pathway from the venture starting point to the expected outcome point denoting all pitfalls, and areas of loss stemming from factors as outlined above along the attempted paths 252 which, numeric analysis libraries 253, deep learning libraries 254, secure rank functions which allow predictive analysis of infrastructure vulnerability management of both limited cooperative ventures or more complicated agreements such as mergers by either exact calculation for smaller datasets or an iterative method for larger, distributed dataset such as those encountered when using APACHE SPARK™ 255, probability of ruin functions 256, Monte-Carlo search libraries, which predictively attempts to iteratively find the best pathway from the venture starting point to the expected outcome point, denoting all decisions made given multiple runs with varying environmental data 257, and multiple-choice knapsack functions, which weighs all available decisions for profit value by attaching a profit toll to each and then choosing those decisions in-turn until the path with the least profit toll is found 258 and modified Mendel-Sheridan functions which allow weighting and inclusion of expert opinion data offered in response to factors highly analogous but not actually part of the current multi-corporation cooperative venture. Pre-existing deep learning routines including numeric analysis libraries 253, and information theory statistics engine 254 may also be used. The invention may also make use of other libraries and capabilities that are known to those skilled in the art as instrumental in the multi-corporation cooperative venture risk analysis. Predictive simulations of the progression of the cooperative venture of interest may be run within the system by the action outcome simulation module 125 to present as many probably outcomes as possible such that the most accurately informed decision on whether to continue with the venture and if so, how to best proceed under various possible circumstances to assure the least loss and a profitable outcome. Data from storage 260 may also be re-run at later sessions as up-to-date environmental and progress data are retrieved to modify the path to the best possible line. Results are formatted as per the analysts pre-designed specifications, which may involve text descriptions, tabular data, diagrams and video presentations of desired facets of venture progress by the observation and state estimation service 140 which is highly scriptable 140b and possesses a gaming engine 140a to assist in generating impactful presentations. These results may be presented to the analysts at the client interface 105

Other modules that make up the business operating system may also perform significant analytical transformations on trade related data. These may include the multidimensional time series data store 120 with its robust scripting features which may include a distributive friendly, fault-tolerant, real-time, continuous run prioritizing, programming platform such as, but not limited to Erlang/OTP and a compatible but comprehensive and proven library of math functions of which the $C^{++}$ math libraries are an example, data formalization and ability to capture time series data including irregularly transmitted, burst data; the GraphStack service 145 which transforms data into graphical representations for relational analysis and may use packages for graph format data storage such as Titan or the like and a highly interface accessible programming interface an example of which may be Akka/Spray, although other, similar, combinations may equally serve the same purpose in this role to facilitate optimal data handling; the directed computational graph module 155 and its distributed data pipeline 155a supplying related general transformer service module 160 and decomposable transformer module 150 which may efficiently carry out linear, branched, and recursive transformation pipelines during trading data analysis may be programmed with multiple trade related functions involved in predictive analytics of the received trade data. Both possibly during and following predictive analyses carried out by the system, results must be presented to clients 105 in formats best suited to convey the both important results for analysts to make highly informed decisions and, when needed, interim or final data in summary and potentially raw for direct human analysis. Simulations which may use data from a plurality of field spanning sources to predict future trade conditions these are accomplished within the action outcome simulation module 125. Data and simulation formatting may be completed or performed by the observation and state estimation service 140 using its ease of scripting and gaming engine to produce optimal presentation results.

In cases where there are both large amounts of data to be cleansed and formalized and then intricate transformations such as those that may be associated with deep machine learning, predictive analytics and predictive simulations, distribution of computer resources to a plurality of systems may be routinely required to accomplish these tasks due to the volume of data being handled and acted upon. The business operating system employs a distributed architecture that is highly extensible to meet these needs. A number of the tasks carried out by the system are extremely processor intensive and for these, the highly integrated process of hardware clustering of systems, possibly of a specific hardware architecture particularly suited to the calculations inherent in the task, is desirable, if not required for timely completion. The system includes a computational clustering module to allow the configuration and management of such clusters during application of the business operating system. While the computational clustering module is drawn directly connected to specific co-modules of the business operating system these connections, while logical, are for ease of illustration and those skilled in the art will realize that the functions attributed to specific modules of an embodiment may require clustered computing under one use case and not under others. Similarly, the functions designated to a clustered configuration may be role, if not run, dictated. Further, not all use cases or data runs may use clustering.

The large amount of software engineered infrastructure, which is specifically designed to find, retrieve, normalize and then analytically transform extremely large volumes of task, here business task, related information allows the invention to perform information theory based predictive analytics on amounts of data that may greatly surpass the amount of input data that a small team of due diligency analysts may find and retrieve. In any case the volume of data available to the business operating system is expected to overwhelm the hypothetical diligence team who would also be on a time budget. We propose that the intelligent, predictive analysis of such a large volume of data with the result being accurate fact and recommendation inclusive reports with presentation ready simulations, where intelligently engineered software and the hardware it runs on does the heavy lifting providing the human analysts with actionable results that may then be debated. An extension of the just described capabilities may be the automated, intelligent, review of all data for an existing contract for contract optimization or renegotiation based upon the re-aligned valuation of a single contract or a portfolio of contracts (or re-aligned maximum liability for a counterparty). Many contracts or contract portfolios may be significantly streamlined and costs reduced by such a re-evaluation. In this way, the invention far surpasses currently available methods of venture risk analysis.

Figure 3:
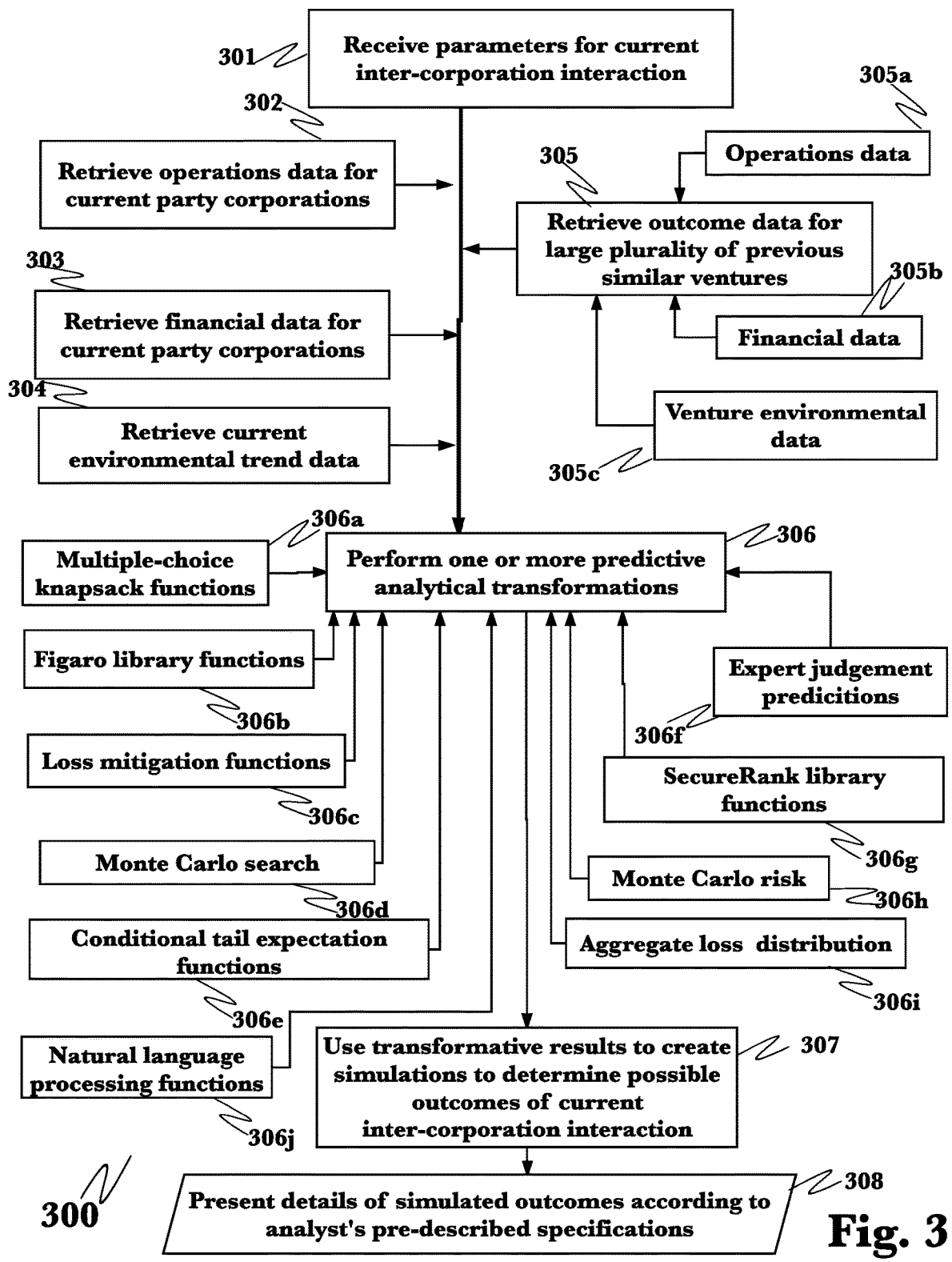
FIG. 3 is a flow diagram of an exemplary function of the business operating system in the use of an intelligent automated planning system to predict future performance of large-scale operations and to manage risk.

FIG. 3 is a flow diagram of an exemplary method 300 of the business operating system in the intelligent automated planning system to predict future performance of large-scale operations and to manage risk. New inter-corporation cooperative interaction opportunities are continuously arising and the ability to profitably participate is of great importance. An embodiment of invention 100 programmed to analyze cooperative venture related data and manage risk as well as predicting operational best practices may allow mutually profitable stipulations to be identified and included in the process. Available data describing a current inter-corporation interaction including, but not limited to participant corporation financials 303, operations data from the participating corporations 302, and environmental data such as, but not limited to product market strengths of any product from either company that might be included in the venture; current economic strength as it relates to purchase of products in the same class as any venture related products, labor trends that may affect the participating corporations workforce and financials, among many other similar factors known to those skilled in the art, may be entered manually by an agent or retrieved from one or more data stores 301. Retrieval or input of any present or historical risk related data, possibly from past cooperative ventures 305, such as, but not limited to: corporate operations data 305a, participant corporation financial data 305b, and environmental data 305c, deemed similar to the current venture from a plurality of both public and available private or proprietary sources acts to seed the process 306, specific modules of the system such as the connector module 135 with its programmable messaging service 135a, the high volume web crawler 115 and the directed computational graph module 155, among possible others act to scrub, format and normalize data from many sources for use. Such data is then subjected to predictive analytical transformations, which may include risk model functions such as but not limited to multiple-choice knapsack functions 306a; Figaro probabilistic model manipulation libraries 306b; loss mitigation functions, which involves the choosing components within the multi-corporate cooperative venture agreements that minimize value at risk 306c; Monte Carlo search functions 306d; conditional tail expectation functions 306e; libraries to normalize and incorporate expert judgement predictions 306f; SecureRank calculation functions 306g; Monte Carlo risk 306h; and aggregate loss distribution functions, adapted from similar insurance industry specific calculations 306h. Contract primitives for contracts under analysis by the platform may be isolated by processing the text of the contract, contracts, or one or more members of a portfolio using natural language processing functions built into the platform 306j. For example, contract primitives from the text of previous contractual agreements between the two involved corporate parties felt to have been advantageous to both corporations, contracts which may have acted as precursors to the current effort, or, similarly, the text one or more contracts felt to be models for the current endeavor may be isolated using the natural language processing functions 306j. These contract primitives may then be transformed and applied to the generation of a current proposed contact by the platform such that they are guides in the predictive analytics process of platform-mediated contract generation even when the contract being formulated is far afield of the model contracts input in categorical substance or when specific current corporate environmental realities do not match those present at the time of model contract. The preceding calculations may be used individually or in combination during the course of the predictive analytic transformations performed by system 306. The transformations described may then be used to perform multiple simulations of the proposed inter-corporation cooperative interaction plan using different combinations of calculated results and slightly variant input data to determine the effect of different model assumptions and condition variance in light of the best data set available 307. All of these results are formatted and presented according to analyst's specifications which may include text summaries and descriptions, tabular representation of result data, or video representations of the path of cooperative venture progress under the proposed inter-corporate agreement parameters 308.

The large amount of software engineered infrastructure, which is specifically designed to find, retrieve, normalize and then analytically transform extremely large volumes of task, here business task, related information allows the invention to perform information theory based predictive analytics on amounts of data that may greatly surpass the amount of input data that a small team of due diligence analysts may find and retrieve. In any case the volume of data available to the business operating system is expected to overwhelm the hypothetical diligence team who would also be on a time budget. According to an aspect, intelligent automated and predictive analysis of such a large volume of data is performed to generate accurate fact and recommendation reports with presentation-ready simulations, where intelligent software and the hardware it runs on does the heavy lifting providing human analysts with actionable results. An extension of these capabilities may allow two participants, both subscribers on the platform, to automate contract term negotiation, including difference estimation using the platform to drive toward conversion with the only intervention by humans being contract term acceptance by representatives of both parties. Under this use case each party may need only to provide specific business goals and expectations they require from the resultant contract, prioritizing the business goals and providing any alternate stipulation categories that may be available during contract deliberations. In this way, the invention far surpasses currently available methods of venture risk analysis.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Figure 4:
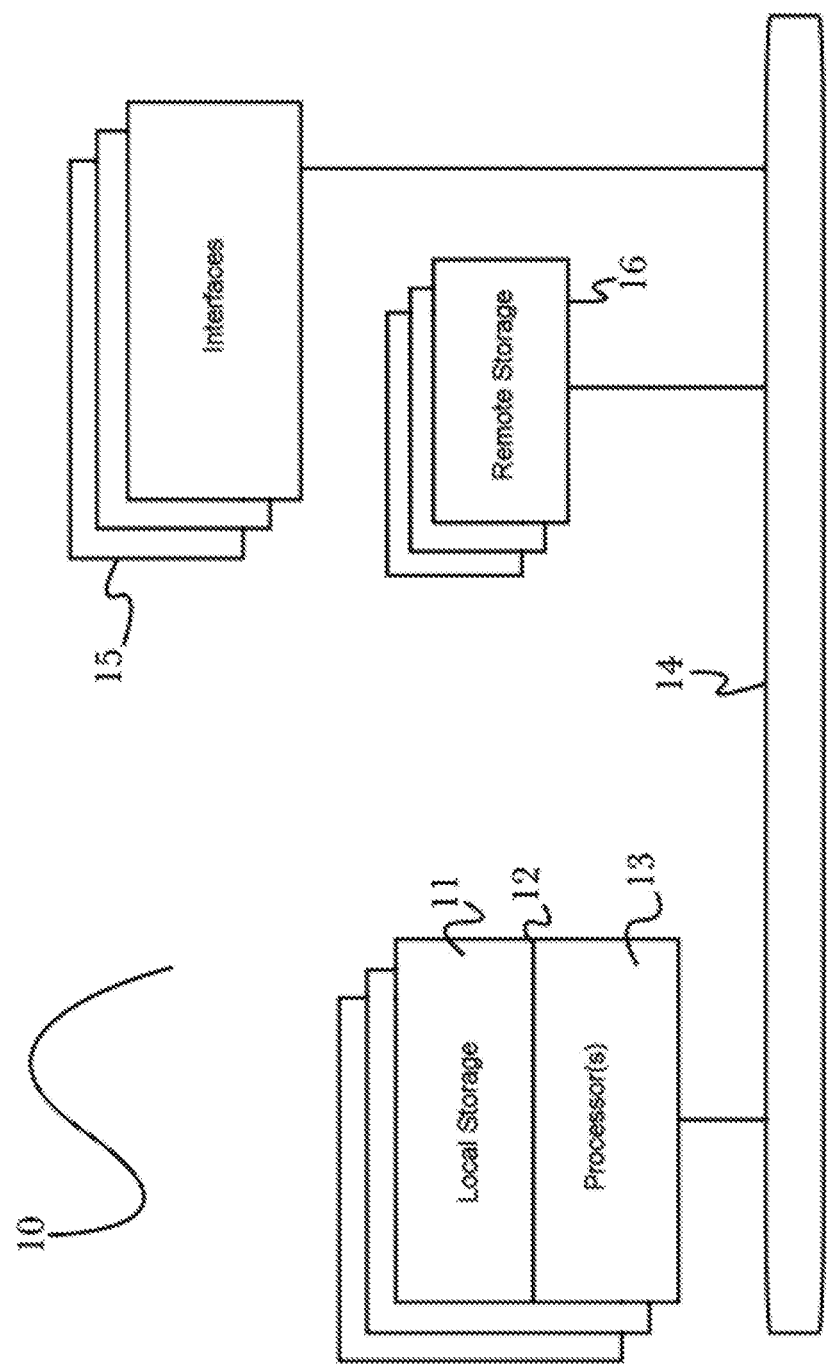
FIG. 4 is a block diagram illustrating an exemplary hardware architecture of a computing device used in various embodiments of the invention.

Referring now to FIG. 4, there is shown a block diagram depicting an exemplary computing device 10 suitable for implementing at least a portion of the features or functionalities disclosed herein. Computing device 10 may be, for example, any one of the computing machines listed in the previous paragraph, or indeed any other electronic device capable of executing software- or hardware-based instructions according to one or more programs stored in memory. Computing device 10 may be configured to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 10 includes one or more central processing units (CPU) 12, one or more interfaces 15, and one or more busses 14 (such as a peripheral component interconnect (PCI) bus). When acting under the control of appropriate software or firmware, CPU 12 may be responsible for implementing specific functions associated with the functions of a specifically configured computing device or machine. For example, in at least one embodiment, a computing device 10 may be configured or designed to function as a server system utilizing CPU 12, local memory 11 and/or remote memory 16, and interface(s) 15. In at least one embodiment, CPU 12 may be caused to perform one or more of the different types of functions and/or operations under the control of software modules or components, which for example, may include an operating system and any appropriate applications software, drivers, and the like.

CPU 12 may include one or more processors 13 such as, for example, a processor from one of the Intel, ARM, Qualcomm, and AMD families of microprocessors. In some embodiments, processors 13 may include specially designed hardware such as application-specific integrated circuits (ASICs), electrically erasable programmable read-only memories (EEPROMs), field-programmable gate arrays (FPGAs), and so forth, for controlling operations of computing device 10. In a specific embodiment, a local memory 11 (such as non-volatile random access memory (RAM) and/or read-only memory (ROM), including for example one or more levels of cached memory) may also form part of CPU 12. However, there are many different ways in which memory may be coupled to system 10. Memory 11 may be used for a variety of purposes such as, for example, caching and/or storing data, programming instructions, and the like. It should be further appreciated that CPU 12 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 15 are provided as network interface cards (NICs). Generally, NICs control the sending and receiving of data packets over a computer network; other types of interfaces 15 may for example support other peripherals used with computing device 10. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 15 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown and described above illustrates one specific architecture for a computing device 10 for implementing one or more of the inventions described herein, it is by no means the only device architecture on which at least a portion of the features and techniques described herein may be implemented. For example, architectures having one or any number of processors 13 may be used, and such processors 13 may be present in a single device or distributed among any number of devices. In one embodiment, a single processor 13 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 16 and local memory 11) configured to store data, program instructions for the general-purpose network operations, or other information relating to the functionality of the embodiments described herein (or any combinations of the above). Program instructions may control execution of or comprise an operating system and/or one or more applications, for example. Memory 16 or memories 11, 16 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a JAVA™ compiler and may be executed using a Java virtual machine or equivalent, or files containing higher level code that may be executed by the computer using an interpreter (for example, scripts written in Python, Perl, Ruby, Groovy, or any other scripting language).

Figure 5:
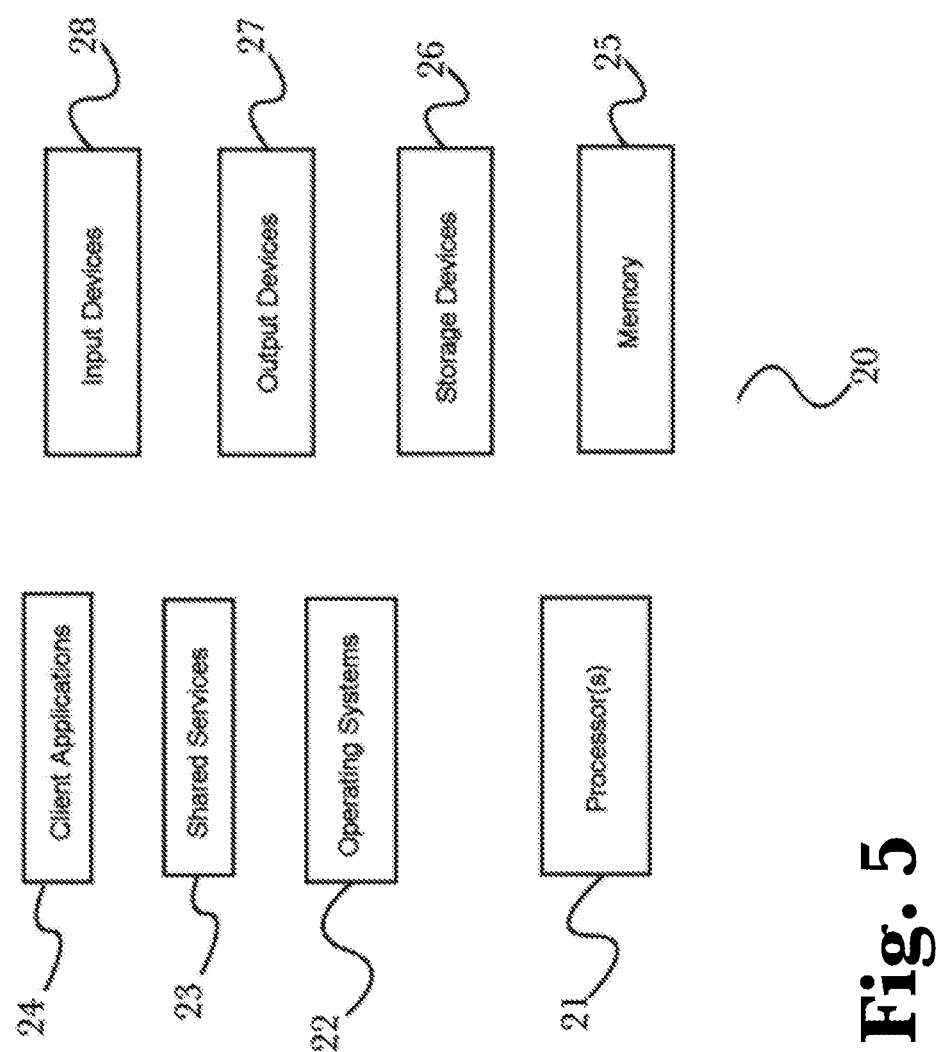
FIG. 5 is a block diagram illustrating an exemplary logical architecture for a client device, according to various embodiments of the invention.

In some embodiments, systems according to the present invention may be implemented on a standalone computing system. Referring now to FIG. 5, there is shown a block diagram depicting a typical exemplary architecture of one or more embodiments or components thereof on a standalone computing system. Computing device 20 includes processors 21 that may run software that carry out one or more functions or applications of embodiments of the invention, such as for example a client application 24. Processors 21 may carry out computing instructions under control of an operating system 22 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 23 may be operable in system 20, and may be useful for providing common services to client applications 24. Services 23 may for example be WINDOWS™ services, user-space common services in a Linux environment, or any other type of common service architecture used with operating system 21. Input devices 28 may be of any type suitable for receiving user input, including for example a keyboard, touchscreen, microphone (for example, for voice input), mouse, touchpad, trackball, or any combination thereof. Output devices 27 may be of any type suitable for providing output to one or more users, whether remote or local to system 20, and may include for example one or more screens for visual output, speakers, printers, or any combination thereof. Memory 25 may be random-access memory having any structure and architecture known in the art, for use by processors 21, for example to run software. Storage devices 26 may be any magnetic, optical, mechanical, memristor, or electrical storage device for storage of data in digital form (such as those described above). Examples of storage devices 26 include flash memory, magnetic hard drive, CD-ROM, and/or the like.

Figure 6:
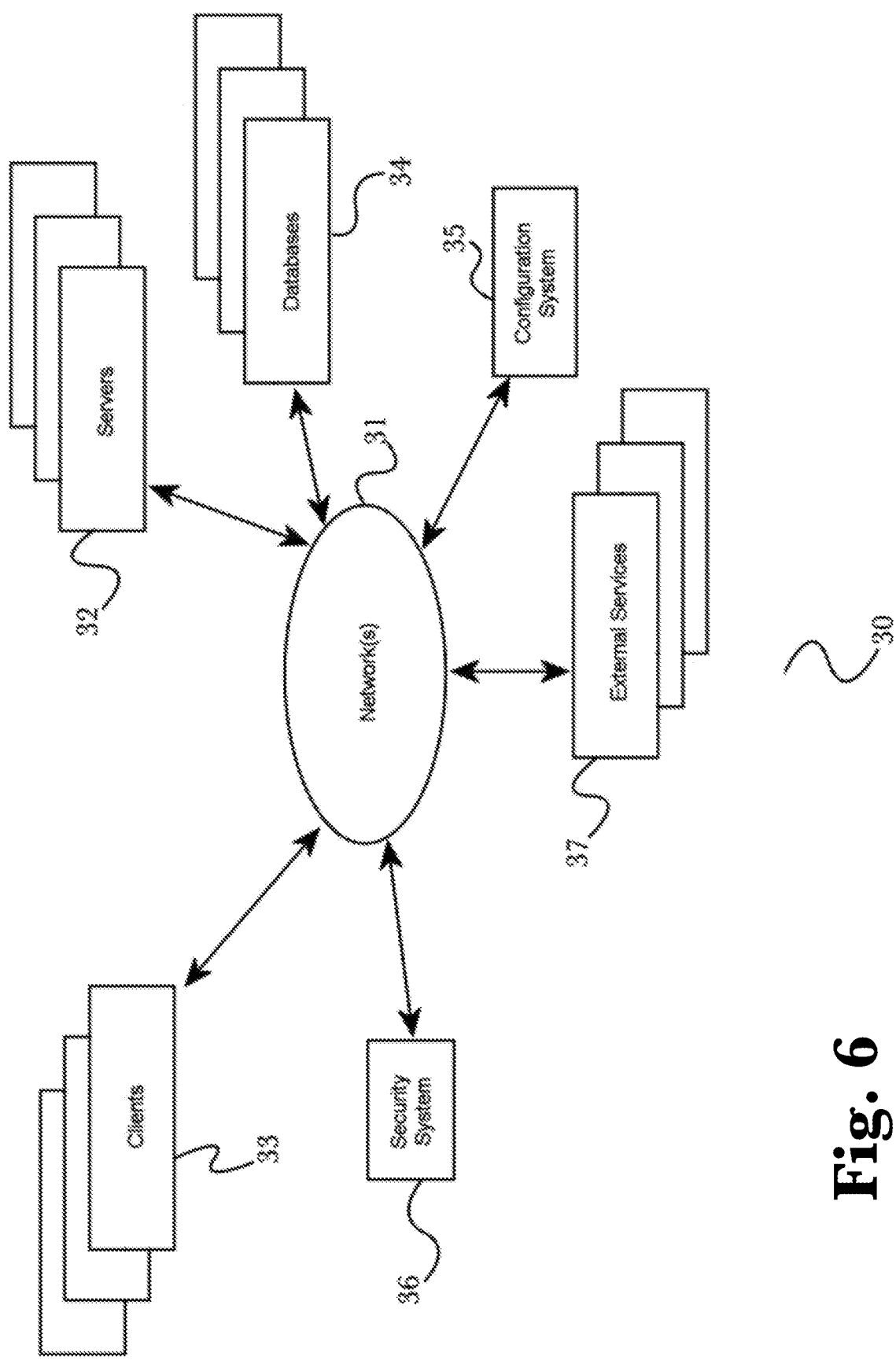
FIG. 6 is a block diagram illustrating an exemplary architectural arrangement of clients, servers, and external services, according to various embodiments of the invention.

In some embodiments, systems of the present invention may be implemented on a distributed computing network, such as one having any number of clients and/or servers. Referring now to FIG. 6, there is shown a block diagram depicting an exemplary architecture 30 for implementing at least a portion of a system according to an embodiment of the invention on a distributed computing network. According to the embodiment, any number of clients 33 may be provided. Each client 33 may run software for implementing client-side portions of the present invention; clients may comprise a system 20 such as that illustrated above. In addition, any number of servers 32 may be provided for handling requests received from one or more clients 33. Clients 33 and servers 32 may communicate with one another via one or more electronic networks 31, which may be in various embodiments any of the Internet, a wide area network, a mobile telephony network (such as CDMA or GSM cellular networks), a wireless network (such as WiFi, Wimax, LTE, and so forth), or a local area network (or indeed any network topology known in the art; the invention does not prefer any one network topology over any other).

Networks 31 may be implemented using any known network protocols, including for example wired and/or wireless protocols.

In addition, in some embodiments, servers 32 may call external services 37 when needed to obtain additional information, or to refer to additional data concerning a particular call. Communications with external services 37 may take place, for example, via one or more networks 31. In various embodiments, external services 37 may comprise web-enabled services or functionality related to or installed on the hardware device itself. For example, in an embodiment where client applications 24 are implemented on a smartphone or other electronic device, client applications 24 may obtain information stored in a server system 32 in the cloud or on an external service 37 deployed on one or more of a particular enterprise's or user's premises.

In some embodiments of the invention, clients 33 or servers 32 (or both) may make use of one or more specialized services or appliances that may be deployed locally or remotely across one or more networks 31. For example, one or more databases 34 may be used or referred to by one or more embodiments of the invention. It should be understood by one having ordinary skill in the art that databases 34 may be arranged in a wide variety of architectures and using a wide variety of data access and manipulation means. For example, in various embodiments one or more databases 34 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 36 and configuration systems 35. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 36 or configuration system 35 or approach is specifically required by the description of any specific embodiment.

Figure 7:
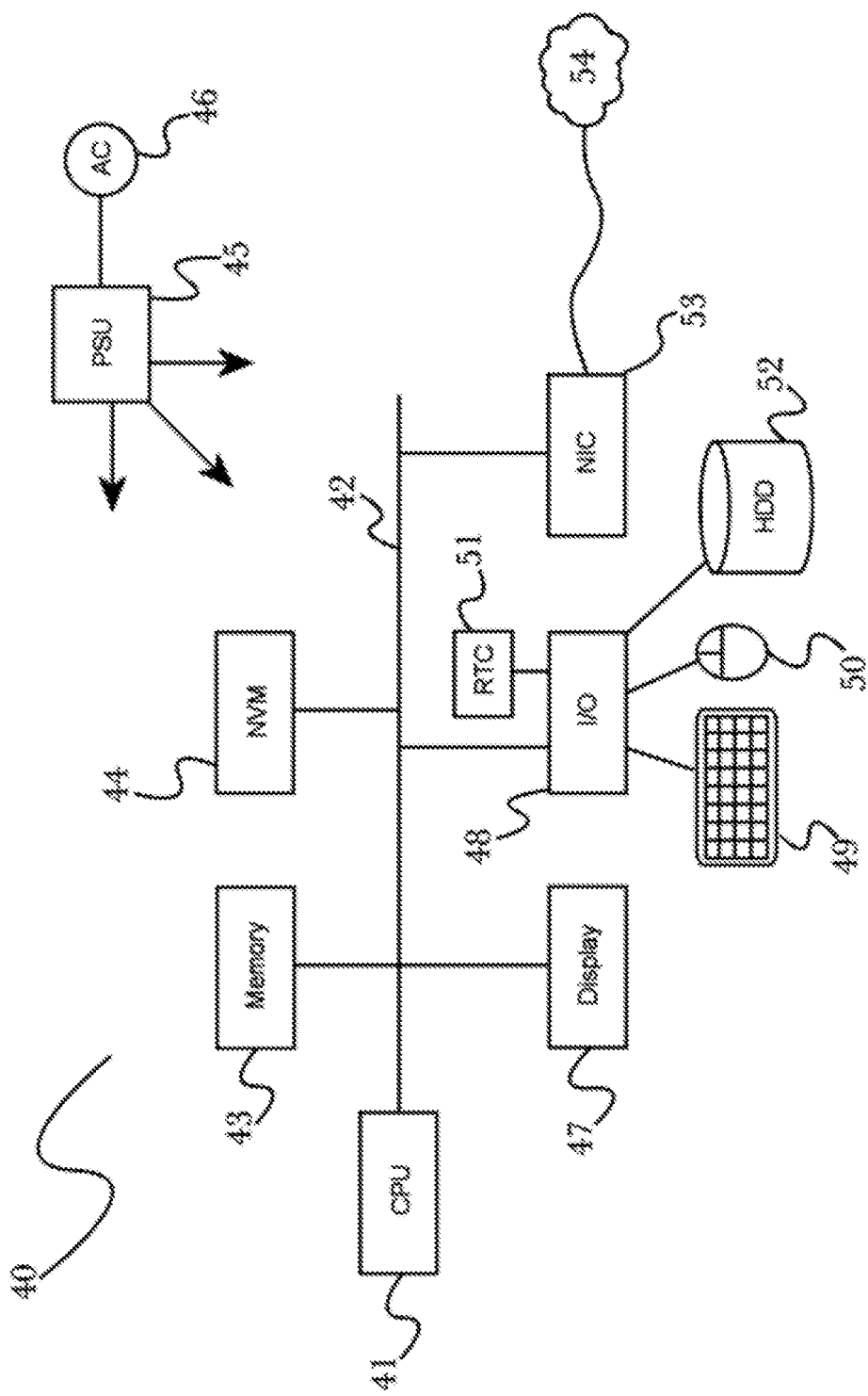
FIG. 7 is another block diagram illustrating an exemplary hardware architecture of a computing device used in various embodiments of the invention.

FIG. 7 shows an exemplary overview of a computer system 40 as may be used in any of the various locations throughout the system. It is exemplary of any computer that may execute code to process data. Various modifications and changes may be made to computer system 40 without departing from the broader scope of the system and method disclosed herein. Central processor unit (CPU) 41 is connected to bus 42, to which bus is also connected memory 43, nonvolatile memory 44, display 47, input/output (I/O) unit 48, and network interface card (NIC) 53. I/O unit 48 may, typically, be connected to keyboard 49, pointing device 50, hard disk 52, and real-time clock 51. NIC 53 connects to network 54, which may be the Internet or a local network, which local network may or may not have connections to the Internet. Also shown as part of system 40 is power supply unit 45 connected, in this example, to a main alternating current (AC) supply 46. Not shown are batteries that could be present, and many other devices and modifications that are well known but are not applicable to the specific novel functions of the current system and method disclosed herein. It should be appreciated that some or all components illustrated may be combined, such as in various integrated applications, for example Qualcomm or Samsung system-on-a-chip (SOC) devices, or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

The multi-corporation cooperative venture plan platform described here is built upon highly programmable computer software architecture that may serve as the basis of a plurality of specific use systems. For example the architecture and base programming described here 100 being employed as an risk reduction decision platform 200 is the same computer architecture described in ¶032 and ¶033 of co-pending application Ser. No. 15/237,625 and specifically used as a cyber-attack detection mitigation and remediation platform in ¶035 through ¶037 of co-pending application Ser. No. 15/237,625; the entire specification of co-pending application Ser. No. 15/237,625 is incorporated herein by reference. The same base architecture and programming, presented here and previously and designed to be readily augmented by application specific data stores and programming may take on the capabilities or personalities of a plurality of highly advanced platforms in a plurality of fields both business and scientific where large volumes of data, at least a portion of which may enter the system in bursts or at irregular intervals is present and data which may need normalization and transformation as well as correlation of possibly hard to discern commonalities. The personality instilled platform may also be used in these fields to perform reliable analytics and run reliable simulations on the existing data to allow operators to intelligently determine next direction to implement (and which next direction potentially not to implement) potentially saving both time, money and resources. In summary, the business operating system disclosed here and in co-pending applications may be imagined more as a set of software engineered stations in a highly and readily modifiable virtual production line than as only a cyber-attack detection, mitigation and remediation system, as only trading decision platform and only a agreement risk reduction platform as it is all three and may be more.

In various embodiments, functionality for implementing systems or methods of the present invention may be distributed among any number of client and/or server components. For example, various software modules may be implemented for performing various functions in connection with the present invention, and such modules may be variously implemented to run on server and/or client.

The skilled person will be aware of a range of possible modifications of the various embodiments described above. Accordingly, the present invention is defined by the claims and their equivalents.

What is claimed is:

1. A computing system for prediction of future performance of large-scale operations and to manage financial, operational and market execution risk employing an intelligent automated planning system, the computing system comprising:
one or more hardware processors configured for:
instantiating a distributed computational graph comprising nodes representing data transformations and edges representing messages between the nodes, wherein:
the distributed computational graph comprises a data processing workflow for analyzing a large-scale operational plan and associated risk factors based on market, operations and financial data retrieved over the web from both corporate operations data stores and other exogenous sources; and
the data transformation of one or more of the nodes comprises receipt of data from at least one physical or virtual sensor or application telemetry source;
storing the data processing workflow of the distributed computational graph;
performing a plurality of analytic and simulation computations as directed by the data processing workflow of the distributed computational graph;
producing a first result comprising a first plurality of estimated future states of the large-scale operational plan under at least one scenario over a finite time horizon; and
producing a second result comprising at least one additional scenario and a second plurality of estimated future states associated with the at least one additional scenario, and a plurality of associated risk factors and their impact on the first and second pluralities of estimated future states.

2. The computing system of claim 1, wherein the one or more hardware processors are further configured for:
automatically negotiating contract terms for at least two system subscriber parties jointly undertaking the large-scale operational plan using difference estimation analytics such that a resultant contract requires only contract term acceptance by human representatives of the system subscriber parties to bind the parties to carry out the large-scale operational plan.

3. The computing system of claim 2, wherein natural language processing is used to analyze text of at least one existing contract to extract contract primitives as part of its contract analysis.

4. The computing system of claim 2, wherein the system determines a valuation and a maximum liability for a counterparty of at least one existing contract or contract portfolio.

5. The computing system of claim 2, wherein the system renegotiates or optimizes at least one contract in a portfolio of contracts between parties in the large-scale operational plan using existing contract instruments as input.

6. The computing system of claim 2, wherein the system renegotiates or optimizes at least one contract between corporation parties in at least one multi-corporation venture plan using existing an existing contract instrument as input.

7. The computing system of claim 2, wherein the one or more hardware processors are further configured for:
determining contract terms for at least two system subscriber parties jointly undertaking the large-scale operational plan using difference estimation analytics such that a resultant contract requires only contract term acceptance by human representatives of the system subscriber parties to bind the parties to carry out the large-scale operational plan;
presenting a contract comprising the contract terms to both of the at least two system subscriber parties; and
obtaining the contract term acceptance by the human representatives.

8. The computing system of claim 1, wherein the one or more hardware processors are further configured for:
comparing the at least one scenario of the first result to the at least one additional scenario of the second result based on individual metrics and aggregate metrics, wherein the aggregate metrics are determined by at least one objective function.

9. The computing system of claim 8, wherein multiple objective functions are used to perform the comparison, wherein each objective function of the multiple objective functions is for a different business objective.

10. A computer-implemented method executed on an intelligent automated planning system for prediction of future performance of large-scale operations and to manage financial, operational and market execution risk, the computer implemented method comprising:
instantiating a distributed computational graph comprising nodes representing data transformations and edges representing messages between the nodes, wherein:
the distributed computational graph comprises a data processing workflow for analyzing a large-scale operational plan and associated risk factors based on market, operations and financial data retrieved over the web from both corporate operations data stores and analogous previous venture outcome data stores; and
the data transformation of one or more of the nodes comprises receipt of data from a physical sensor;
storing the data processing workflow of the distributed computational graph;
performing a plurality of analytic and simulation computations as directed by the data processing workflow of the distributed computational graph;
producing a first result comprising a first plurality of estimated future states of the large-scale operational plan under at least one scenario over a finite time horizon; and
producing a second result comprising at least one additional scenario and a second plurality of estimated future states associated with the at least one additional scenario, and a plurality of associated risk factors and their impact on the first and second pluralities of estimated future states.

11. The computer-implemented method of claim 10, comprising the additional step of:
automatically negotiating contract terms for at least two system subscriber parties jointly undertaking the large-scale operational plan using difference estimation analytics such that a resultant contract requires only contract term acceptance by human representatives of the system subscriber parties to bind the parties to carry out the large-scale operational plan.

12. The computer-implemented method of claim 11 wherein the intelligent automated planning subsystem uses natural language processing to analyze the text of at least one existing contract to extract contract primitives as part of its contract analysis.

13. The computer-implemented method of claim 11, wherein the intelligent automated planning subsystem is used to intelligently determine a valuation and a maximum liability for a counterparty of at least one existing contract or contract portfolio.

14. The computer-implemented method of claim 11, wherein the intelligent automated planning subsystem is used to intelligently renegotiate or optimize at least one contract in a portfolio of contracts between parties in the large-scale operational plan using existing contract instruments as input.

15. The computer-implemented method of claim 11, wherein the intelligent automated planning subsystem is used to intelligently renegotiate or optimize at least one contract between corporation parties in at least one multi-corporation venture plan using existing an existing contract instrument as input.

16. The computer-implemented method of claim 11, comprising the additional steps of:
   determining contract terms for at least two system subscriber parties jointly undertaking the large-scale operational plan using difference estimation analytics such that a resultant contract requires only contract term acceptance by human representatives of the system subscriber parties to bind the parties to carry out the large-scale operational plan;
   presenting a contract comprising the contract terms to both of the at least two system subscriber parties; and
   obtaining the contract term acceptance by the human representatives.

17. The computer-implemented method of claim 10, comprising the additional step of:
   comparing the at least one scenario of the first result to the at least one additional scenario of the second result based on individual metrics and aggregate metrics, wherein the aggregate metrics are determined by at least one objective function.

18. The computer-implemented method of claim 17, wherein multiple objective functions are used to perform the comparison, wherein each objective function of the multiple objective functions is for a different business objective.

19. A system for prediction of future performance of large-scale operations and to manage financial, operational and market execution risk employing an intelligent automated planning system, comprising one or more computers each comprising a hardware processor with executable instructions that, when executed, cause the system to:
   instantiate a distributed directed computational graph comprising nodes representing data transformations and edges representing messages between the nodes, wherein:
      the distributed computational graph comprises a data processing workflow for analyzing a large-scale operational plan and associated risk factors based on market, operations and financial data retrieved over the web from both corporate operations data stores and other exogenous sources; and
      the data transformation of one or more of the nodes comprises receipt of data from at least one physical or virtual sensor or application telemetry source;
   store the data processing workflow of the distributed computational graph;
   perform a plurality of analytic and simulation computations as directed by the data processing workflow of the distributed computational graph;
   produce a first result comprising a first plurality of estimated future states of the large-scale operational plan under at least one scenario over a finite time horizon; and
   produce a second result comprising at least one additional scenario and a second plurality of estimated future states associated with it the at least one additional scenario, and a plurality of associated risk factors and their impact on the first and second pluralities of estimated future states.

20. The system of claim 19, wherein the system is further caused to:
   automatically negotiate contract terms for at least two system subscriber parties jointly undertaking the large-scale operational plan using difference estimation analytics such that a resultant contract requires only contract term acceptance by human representatives of the system subscriber parties to bind the parties to carry out the large-scale operational plan.

21. The system of claim 20, wherein the natural language processing is used to analyze the text of at least one existing contract to extract contract primitives as part of its contract analysis.

22. The system of claim 20, wherein the system is further caused to intelligently determine a valuation and a maximum liability for a counterparty of at least one existing contract or contract portfolio.

23. The system of claim 20, wherein the system is further caused to renegotiate or optimize at least one contract in a portfolio of contracts between parties the large-scale operational plan using existing contract instruments as input.

24. The system of claim 20, wherein the system intelligently renegotiates or optimizes at least one contract between corporation parties in at least one multi-corporation venture plan using existing an existing contract instrument as input.

25. The system of claim 20, wherein the system is further caused to:
   determine contract terms for at least two system subscriber parties jointly undertaking the large-scale operational plan using difference estimation analytics such that a resultant contract requires only contract term acceptance by human representatives of the system subscriber parties to bind the parties to carry out the large-scale operational plan;
   present a contract comprising the contract terms to both of the at least two system subscriber parties; and
   obtain the contract term acceptance by the human representatives.

26. The system of claim 19, wherein the system is further caused to:
   compare the at least one scenario of the first result to the at least one additional scenario of the second result based on individual metrics and aggregate metrics, wherein the aggregate metrics are determined by at least one objective function.

27. The system of claim 26, wherein multiple objective functions are used to perform the comparison, wherein each objective function of the multiple objective functions is for a different business objective.

28. Non-transitory, computer-readable storage media having computer-executable instructions embodied thereon that, when executed by one or more processors of a computing system employing an intelligent automated planning system for prediction of future performance of large-scale operations and to manage financial, operational and market execution risk, cause the computing system to:
   instantiate a distributed computational graph comprising nodes representing data transformations and edges representing messages between the nodes, wherein:

the distributed computational graph comprises a data processing workflow for analyzing a large-scale operational plan and associated risk factors based on market, operations and financial data retrieved over the web from both corporate operations data stores and other exogenous sources; and the data transformation of one or more of the nodes comprises receipt of data from at least one physical or virtual sensor or application telemetry source;

store the data processing workflow of the distributed computational graph;

perform a plurality of analytic and simulation computations as directed by the data processing workflow of the distributed computational graph;

produce a first result comprising a first plurality of estimated future states of the large-scale operational plan under at least one scenario over a finite time horizon; and produce a second result comprising at least one additional scenario and a second plurality of estimated future states associated with it the at least one additional scenario, and a plurality of associated risk factors and their impact on the first and second pluralities of estimated future states.

29. The non-transitory, computer-readable storage media of claim 28, wherein the computing system is further caused to:

automatically negotiate contract terms for at least two system subscriber parties jointly undertaking the large-scale operational plan using difference estimation analytics such that a resultant contract requires only contract term acceptance by human representatives of the system subscriber parties to bind the parties to carry out the large-scale operational plan.

30. The non-transitory, computer-readable storage media of claim 29, wherein the natural language processing is used to analyze the text of at least one existing contract to extract contract primitives as part of its contract analysis.

31. The non-transitory, computer-readable storage media of claim 29, wherein the system intelligently determines a valuation and a maximum liability for a counterparty of at least one existing contract or contract portfolio.

32. The non-transitory, computer-readable storage media of claim 29, wherein the computing system is further caused to intelligently renegotiate or optimize at least one contract in a portfolio of contracts between parties in the large-scale operational plan using existing contract instruments as input.

33. The non-transitory, computer-readable storage media of claim 29, wherein the computing system is further caused to intelligently renegotiate or optimize at least one contract between corporation parties in at least one multi-corporation venture plan using existing an existing contract instrument as input.

34. The non-transitory, computer-readable storage media of claim 29, wherein the computing system is further caused to:

determine contract terms for at least two system subscriber parties jointly undertaking the large-scale operational plan using difference estimation analytics such that a resultant contract requires only contract term acceptance by human representatives of the system subscriber parties to bind the parties to carry out the large-scale operational plan;

present a contract comprising the contract terms to both of the at least two system subscriber parties; and obtain the contract term acceptance by the human representatives.

35. The non-transitory, computer-readable storage media of claim 28, wherein the computing system is further caused to:

compare the at least one scenario of the first result to the at least one additional scenario of the second result based on individual metrics and aggregate metrics, wherein the aggregate metrics are determined by at least one objective function.

36. The non-transitory, computer-readable storage media of claim 35, wherein multiple objective functions are used to perform the comparison, wherein each objective function of the multiple objective functions is for a different business objective.

* * * * *